H. WILSON.
PROCESS OF OBTAINING POTASH SALTS FROM KELP.
APPLICATION FILED OCT. 16, 1912.
1,087,477.
Patented Feb. 17, 1914.
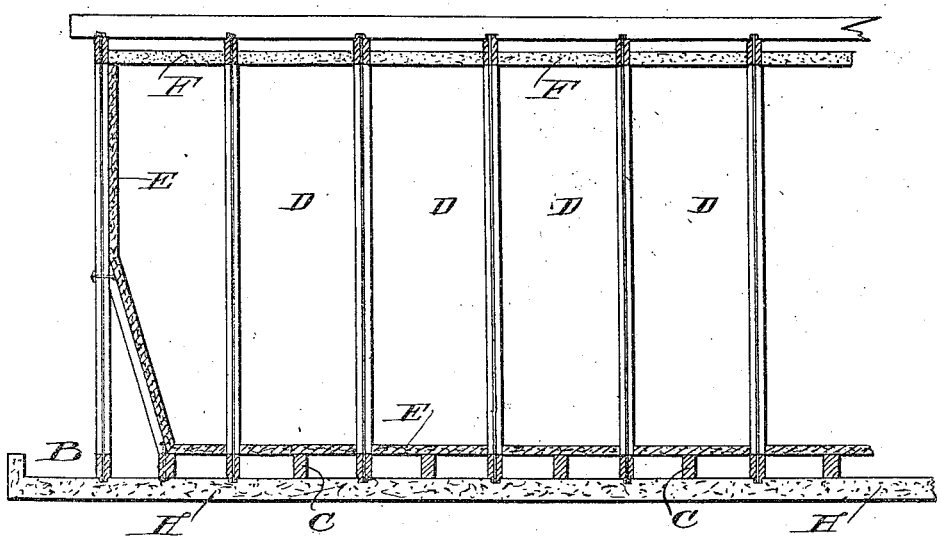
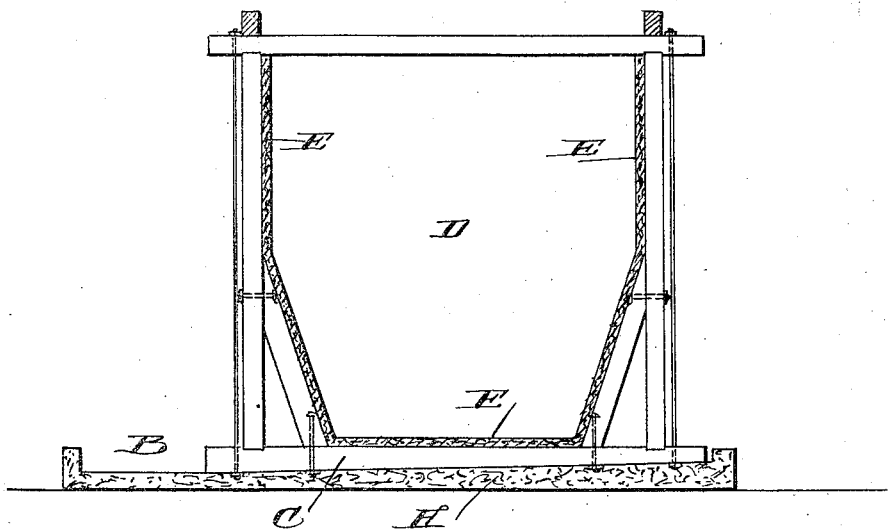

UNITED STATES PATENT OFFICE.

HARRY WILSON, OF SAN FRANCISCO, CALIFORNIA, ASSIGNOR TO PACIFIC KELP CO., OF SAN FRANCISCO, CALIFORNIA, A CORPORATION OF CALIFORNIA.

PROCESS OF OBTAINING POTASH SALTS FROM KELP.

1,087,477.

Specification of Letters Patent.

Patented Feb. 17, 1914.

Application filed October 16, 1912. Serial No. 726,070.

*To all whom it may concern:*

Be it known that I, HARRY WILSON, a subject of the King of England, residing in the city and county of San Francisco and State of California, have invented new and useful Improvements in Processes of Obtaining Potash Salts from Kelp, of which the following is a specification.

This invention relates to a process to increase and make available the nitrogen content of certain kelps or sea-weeds through which all of the salts may be secured and the value of the organic matter preserved for fertilizing purposes.

The nitrogen content of the kelp is all present as organic nitrogen and not available until it has undergone nitrification, which can only come through decomposition of the organic matter. The chlorin in the kelp is the strongest and most active content and must be removed to allow nitrification to take place. Therefore a vat or vessel is constructed that will contain the kelp as it is removed from the beds. The material from which the vat is made is of such nature that the chlorin will effloresce through the side, bottom and top, carrying with it whatever potassium will unite in forming a pure potassium chlorid. This will allow the nitrifying bacilli or animal organisms to completely decompose and nitrify the organic matter and the available nitrogen to combine with the remaining potassium and form potassium nitrate.

Figure 1 is a longitudinal section of an apparatus suitable for practising the invention; only part of the device being shown. Fig. 2 is a cross section.

A, a concrete foundation with waterproof finish and covering of asphaltum that is proof against decomposition by the action of the alkalis; B, concrete receptacle for evaporation under ordinary atmospheric condition; C, timber foundation with asphaltum covering; D, chamber for material; E, outside wall of porous clay or sandstone through which the salts will filter or effloresce; F, covering of pulverized clay to allow the admission of air but exclude the light.

The vat or chamber is filled with green kelp, reasonably free from foreign matter such as sand, shells and drift. Within five days the vegetable cells have broken down, the nitrifying bacilli have commenced work, and a coating of potassium chlorid has effloresced and covered the outside of the porous clay walls and bottom. Within twelve days decomposition is in active progress inside and the efflorescence of potassium chlorid on the outside has much increased. Within thirty days the nitrifying organisms have transformed the contents of the vat to a semi-solution, efflorescence of potassium chlorid on the outside has increased, and efflorescence of potassium chlorid has now started to form on the clay covering on top. From this point decomposition continues on the inside of the vat and efflorescence continues on the outside and top until all of the moisture contained has been exhausted, and the remaining material is practically dry. The dry content is then lixiviated with pure water and a high grade potassium nitrate will then effloresce; this efflorescence of potassium nitrate takes place in the same vessel as the first efflorescence. The remaining content is then dried out and pulverized and used for fertilizer, as sufficient nitrates, phosphates and potash still remain for that purpose. All this inside content remaining at the end of the process is a complete fertilizer containing the required amount of phosphates, nitrates and potash, with the organic matter; and all the outside effloresced values consisting of the chlorids and nitrates, practically free from organic matter are marketable as such.

The chlorids included in the aforesaid outside effloresced values comprise not only chlorid of potassium but chlorid of magnesia and chlorid of sodium. For it is understood that as soon as the nitrifying bacilli have become active there is a chemical reaction takes place on the inside of the kiln, and the chlorin liberated by that operation immediately combines with other salts and toward the latter stage of the operation is effloresced as a chlorid of magnesia and a chlorid of sodium.

Having thus described my invention, what I claim and desire to secure by Letters Patent is—

1. The method of recovering potassium chlorid and potassium nitrate from kelp which consists in placing the kelp in a filtering vessel and excluding the light, permitting decomposition to go on inside the vessel and efflorescence to proceed until the potassium chlorid has accumulated on the outside of the vessel and the moisture in the vessel is evaporated, adding water to the vessel content and then allowing evaporation and efflorescence to proceed as before, to recover the potassium nitrate.

2. The process of treating kelp which consists in placing the kelp to be treated in a porous vat having sufficient filtering power to hold back all the organic matter and to allow efflorescence, permitting the nitrifying bacilli in the kelp to become active, permitting decomposition to proceed until the nitrifying organisms have transformed the contents of the vat to a semi-solution and the chlorid salts have effloresced and deposited on the outside of the vat letting the decomposition and efflorescence continue until the moisture has evaporated, adding water to the vat contents and recovering the nitrates by efflorescence.

3. The method of treating kelp which consists in allowing the kelp to decompose in a porous vessel, and recovering the chlorid salts and nitrates resulting from the decomposition by efflorescence on the outside of the porous vessel.

4. The method of treating kelp which consists in allowing it to decompose recovering the chlorid salts due to decomposition by efflorescence through a filtering medium, then drying the decomposed kelp, lixiviating the dried kelp with water, and recovering the potassium nitrate resulting therefrom.

In testimony whereof I have hereunto set my hand in the presence of two subscribing witnesses.

HARRY WILSON.

Witnesses:
JOHN H. HERRING,
EMMA B. BRU.